(12) United States Patent
Shimoosawa (10) Patent No.: US 6,658,456 B1
(45) Date of Patent: Dec. 2, 2003

(54) ELECTRIC MAIL TRANSFERRING APPARATUS AND ELECTRIC MAIL TRANSFERRING METHOD

(75) Inventor: Hiroyuki Shimoosawa, Fujisawa (JP)

(73) Assignee: Panasonic Communications Co., Ltd., Tokyo (JP)

( * ) Notice: Subject to any disclaimer, the term of this patent is extended or adjusted under 35 U.S.C. 154(b) by 0 days.

(21) Appl. No.: 09/158,579

(22) Filed: Sep. 22, 1998

(30) Foreign Application Priority Data

Sep. 29, 1997 (JP) .............................................. 9-281374

(51) Int. Cl.[7] .............................. G06F 15/16; H04N 1/21

(52) U.S. Cl. ........................ 709/206; 715/516; 358/402

(58) Field of Search .................................. 709/201, 206, 709/245, 207; 358/402, 407; 707/500, 502, 523, 206, 10; 715/502, 523, 526, 516

(56) References Cited

U.S. PATENT DOCUMENTS

| | | | |
|---|---|---|---|
| 5,283,887 A | * | 2/1994 | Zachery ...................... 709/206 |
| 5,493,692 A | | 2/1996 | Theimer et al. |
| 5,548,789 A | * | 8/1996 | Nakanura .................... 709/206 |

(List continued on next page.)

FOREIGN PATENT DOCUMENTS

| | | |
|---|---|---|
| WO | 94/15294 | 7/1994 |
| WO | 97/49251 | 12/1997 |

OTHER PUBLICATIONS

Patel et al "The multimedia Fax–MIME Gateway" IEEE Multi–media Vol 1, No. 4 pp. 601–670 1994.

Aikawa, Seisyu, "Q&A Collection for Answering All the Questions Ranging from Simple One to Maniac One", DOS/V Power Report, vol. 7 No. 6, Impress Co., Jun. 1, 1997, pp. 280–281, CSNW199900034014, with partial English language translation.

Ishikawa, Kunio, "Mobil Computing User's Guide: Fully Using Mobile Communication Network", Mobile Media Magazine, vol. 23, Seamedia Co., Apr. 24, 1997, pp. 92–97, CSNW200000091008, with partial English language translation.

English Language Abstract of JP 9–18509.

(List continued on next page.)

Primary Examiner—Marc D. Thompson
(74) Attorney, Agent, or Firm—Greenblum & Bernstein, P.L.C.

(57) ABSTRACT

A facsimile apparatus is connected to a mail server, and receives an electric tail from a mail box. A header analyzing unit analyzes a header portion of the received electric mail so as to obtain a sender ID. Next, a transfer determination unit matches the obtained sender ID and a content of a sender ID column of a transfer management table. When a match is found, the transfer determination unit reads a content of a transfer destination ID column corresponding to the sender ID column in the transfer management table and a content of a transfer attribute column. An appended file portion is deleted from the electric mail in accordance with the content of the read transfer attribute column, "deletion process." Thereafter, the electric mail from which the appended file portion is deleted is transferred to a transfer destination registered in the read transfer destination ID column.

8 Claims, 10 Drawing Sheets

U.S. PATENT DOCUMENTS

| | | | | |
|---|---|---|---|---|
| 5,689,642 A | * | 11/1997 | Harkins et al. | 709/207 |
| 5,767,985 A | | 6/1998 | Yamamoto et al. | 358/402 |
| 5,771,355 A | * | 6/1998 | Kuzma | 709/245 |
| 5,781,901 A | * | 7/1998 | Kuzma | 358/402 |
| 5,819,040 A | * | 10/1998 | Ogaki et al. | 707/500 |
| 5,862,321 A | * | 1/1999 | Lamming et al. | 358/403 |
| 5,870,549 A | * | 2/1999 | Bobo, II | 709/206 |
| 5,872,926 A | * | 2/1999 | Levac et al. | 709/206 |
| 5,892,909 A | * | 4/1999 | Grasso et al. | 709/201 |
| 5,911,776 A | * | 6/1999 | Guck | 709/217 |
| 5,949,978 A | * | 9/1999 | Kondo et al. | 358/400 |
| 5,964,833 A | * | 10/1999 | Kikinis | 709/206 |
| 5,995,597 A | * | 11/1999 | Woltz et al. | 379/93.24 |
| 6,009,442 A | * | 12/1999 | Chen et al. | 707/522 |
| 6,023,700 A | | 2/2000 | Owens et al. | 707/10 |
| 6,035,104 A | * | 3/2000 | Zahariev | 709/203 |
| 6,073,142 A | * | 6/2000 | Geiger et al. | 707/500 |
| 6,073,165 A | * | 6/2000 | Narasimhan et al. | 709/206 |
| 6,172,763 B1 | * | 1/2001 | Toydoa et al. | 358/402 |
| 6,275,848 B1 | * | 8/2001 | Arnold | 709/206 |

OTHER PUBLICATIONS

English Language Abstract of JP 2–56144.
English Language Abstract of JP 11–88414.
English Language Abstract of JP 10–207795.
English Language Abstract and English Language Translation of a Portion of JP 5–108512.
"Implementation of an Electronic Mail Agent for the Internet", Yukio Saito et al., pp. 154–157, *NTT Technical Journal*, Jul., 1998, with English partial translation.
"The Multimedia Fax–MIME Gateway" by Patel et al., IEEE Multimedia, vol. 1, No. 4, 1994, pp. 64–70.
"Methodology for Mail Delivery in a Multi–Media Environment" IBME Technical Disclosure Bulletin, vol. 36, No. 4, Apr. 1993, pp. 507–508.
"Accessing Messages Your Way", AT&T Technology, vol. 10, No. 1, 1995, pp. 6–9.
English Language Abstract of JP No. 5–199353.

* cited by examiner

| SENDER ID | TRANSFER ID | TRANSFER ATTRIBUTE |
|---|---|---|
| sk200ch@simon.or.jp | 01 − 123 − 456 | FAX |
| * @rdmg.mgcs.or.jp | cbr@t.or.jp | APPENDAGE DELETION |
| * @rdng.or.jp | CDE@pon.or.jp | xdb,gif TRANSFER |
| * @abc.or.jp | speaker | wav |
| xyz001@abc.or.jp | 03 − 548 − 1101 | wav |
| TRANSFER ABSENCE | printer | gif |
| TRANSFER PRESENCE | 03 − 548 − 2259 | FAX |

54 points to row 2; 55 points to row 6.

| FILE EXTENSION | CORRESPONDING APPLICATION |
|---|---|
| xdb | APPLICATION A |
| gif | APPLICATION B |
| lzh | APPLICATION C |
| wav | APPLICATION D |

ELECTRIC MAIL TRANSFERRING APPARATUS AND ELECTRIC MAIL TRANSFERRING METHOD

BACKGROUND OF THE INVENTION

1. Field of the Invention

The present invention relates to an electric mail (e-mail) transferring apparatus for transferring a received e-mail. The present invention also relates to an e-mail transferring method for transferring a received e-mail.

2. Description of the Invention

In accordance with the recent widespread use of personal computers (hereinafter referred to as PC) and the Internet, data receiving and transmitting through e-mails are generally carried out. This data must be a text format. Due to this, binary data itself, which is used in a general PC, can be neither received nor transmitted.

In order to transmit binary data through the e-mail, binary data is converted to text data to be appended to the e-mail. For data conversion, there are used conversion methods such as base 64, uuencode, etc.

In accordance with the development of such a technique and a mobile communication technique, various types of portable digital assistants (hereinafter referred to as PDA) equipped with various kinds of application are used, and e-mail data, to which data prepared by the application is appended, is frequently exchanged.

However, even if the PDA can receive the e-mail, it is impossible to confirm the content of the appended file through the PDA when the application corresponding to the appended file of the e-mail is not mounted to the PDA. It is extremely difficult to mount all kinds of application to the PDA from the technical and economical viewpoints. In a state that the appended file cannot be confirmed, the reception of the e-mail with the appended file results in a wasteful use in a memory and charges for a network.

SUMMARY OF THE INVENTION

An object of the present invention is to provide an electric mail transferring apparatus capable of effectively transferring the electric mail in accordance with the performance and environment of an apparatus used in a transfer destination.

Also, an object of the present invention is to provide an electric mail transferring apparatus capable of transferring the e-mail to a transfer destination even in a case where an apparatus used in the transfer destination cannot receive the electric mail.

Moreover, an object of the present invention is to provide an electric mail transferring method for effectively transferring an electric mail in accordance with the performance and the environment of an apparatus used in a transfer destination.

Furthermore, an object of the present invention is to provide an electric mail transferring method for transferring an electric mail to a transfer destination even in a case where an apparatus used in the transfer destination cannot receive the electric mail.

According to a first aspect of the present invention, there is provided an electric mail transferring apparatus comprising:

mail receiving means for receiving an electric mail;

deleting means for deleting an appended file portion from the electric mail; and transferring means for transferring the electric mail from which the appended file is deleted.

According to a second aspect of the present invention, there is provided an electric mail transferring apparatus comprising:

mail receiving means for receiving an electric mail;

processing means for providing a process in accordance with a kind of appended file included in the electric mail; and transferring means for transferring the electric mail.

According to a third aspect of the present invention, there is provided an electric mail transferring apparatus comprising:

mail receiving means for receiving an electric mail;

processing means for providing a process in accordance with an environment of a transfer destination to data of the electric mail; and transferring means for transferring the electric mail.

According to a fourth aspect of the present invention, there is provided an electric mail transferring apparatus comprising:

mail receiving means for receiving an electric mail;

sender information obtaining means for obtaining sender information from the electric mail;

processing means for providing a process in accordance with transfer process information corresponding to the obtained sender information; and transferring means for transferring the electric mail to a transfer destination corresponding to the obtained sender information.

According to a fifth aspect of the present invention, there is provided an electric mail transferring method comprising the steps of:

receiving an electric mail;

deleting an appended file portion from the electric mail; and transferring the electric mail from which the appended file is deleted.

According to a sixth aspect of the present invention, there is provided an electric mail transferring method comprising the steps of:

receiving an electric mail;

providing a process in accordance with a kind of appended file included in the electric mail; and transferring the electric mail.

According to a seventh aspect of the present invention, there is provided an electric mail transferring method comprising the steps of:

receiving an electric mail;

providing a process in accordance with an environment of a transfer destination to data of the electric mail; and transferring the electric mail.

According to an eighth aspect of the present invention, there is provided an electric mail transferring method comprising the steps of:

receiving an electric mail;

obtaining sender information from the electric mail;

providing a process in accordance with transfer process information corresponding to the obtained sender information; and transferring the electric mail to a transfer destination corresponding to the obtained sender information.

DETAILED DESCRIPTION OF THE PREFERRED EMBODIMENTS

The following will explain an e-mail transferring apparatus of an embodiment of the present invention with reference to the accompanying drawings.

Figure 1:
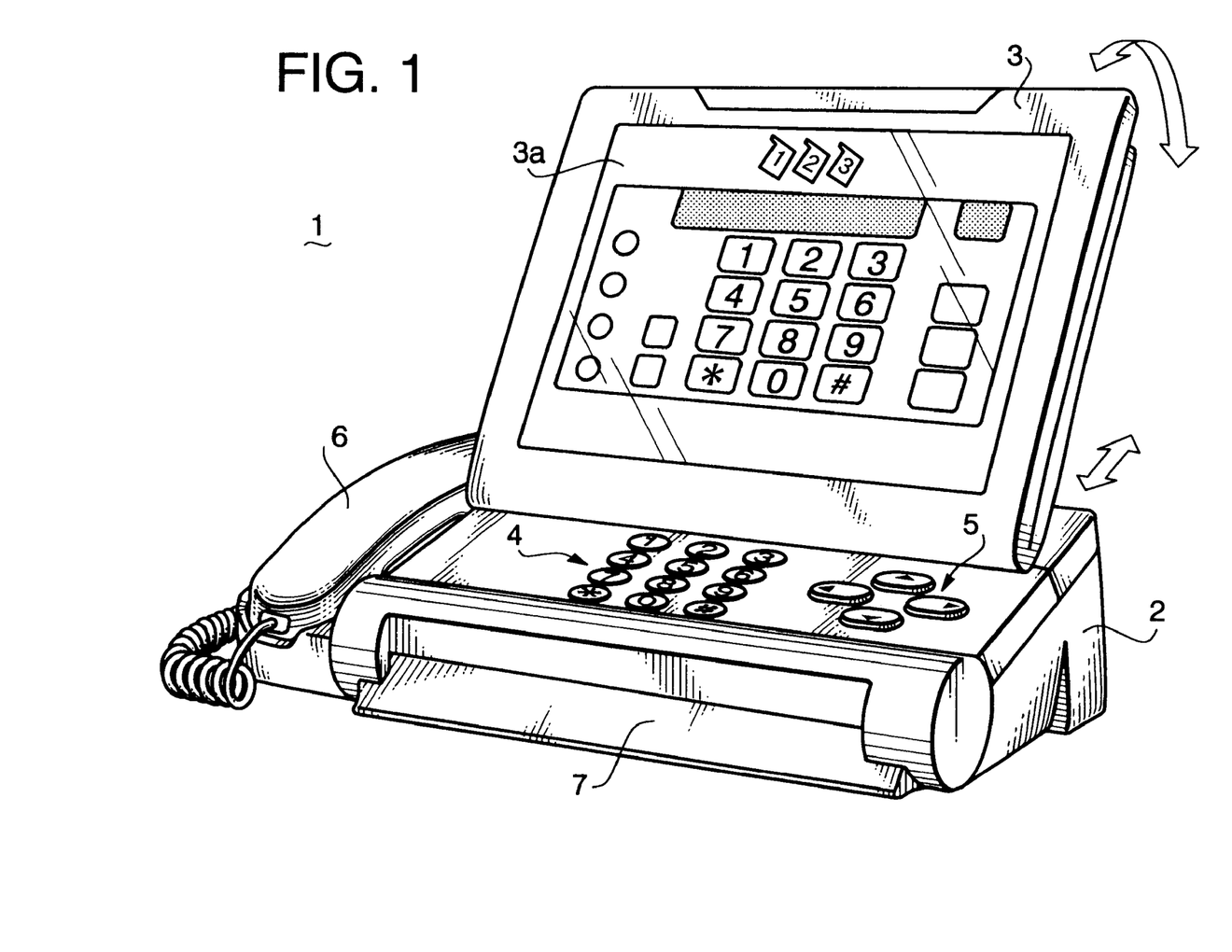
FIG. 1 is a perspective view showing an outline of a facsimile apparatus equipped with an e-mail transferring apparatus of an embodiment of the present invention.

FIG. 1 is a perspective view showing an outline of a facsimile apparatus equipped with e-mail transferring apparatus of the embodiment of the present invention.

A touch panel display 3 is provided on an upper surface portion of a main body 2 of a facsimile apparatus 1 to be freely open and close. The touch panel display 3 is formed to be tilted in a state in which a screen 3a is directed upwardly.

The upper surface portion of the main body 2 has dial keys 4, and cursor keys 5. The cursor keys 5 are input means for moving a cursor and a pointer displayed on the screen 3a in four directions freely. When the touch panel display 3 is absolutely tilted, the dial keys 4 and the cursor keys 5 are covered with the touch panel display 3.

A handset 6 is provided at a side surface portion of the main body 2. Though a receiver with a cord is used as the handset 6 in this example, a cordless receiver may be used. A printer paper discharge unit 7 is provided at a front surface portion of the main body 2.

Figure 2:
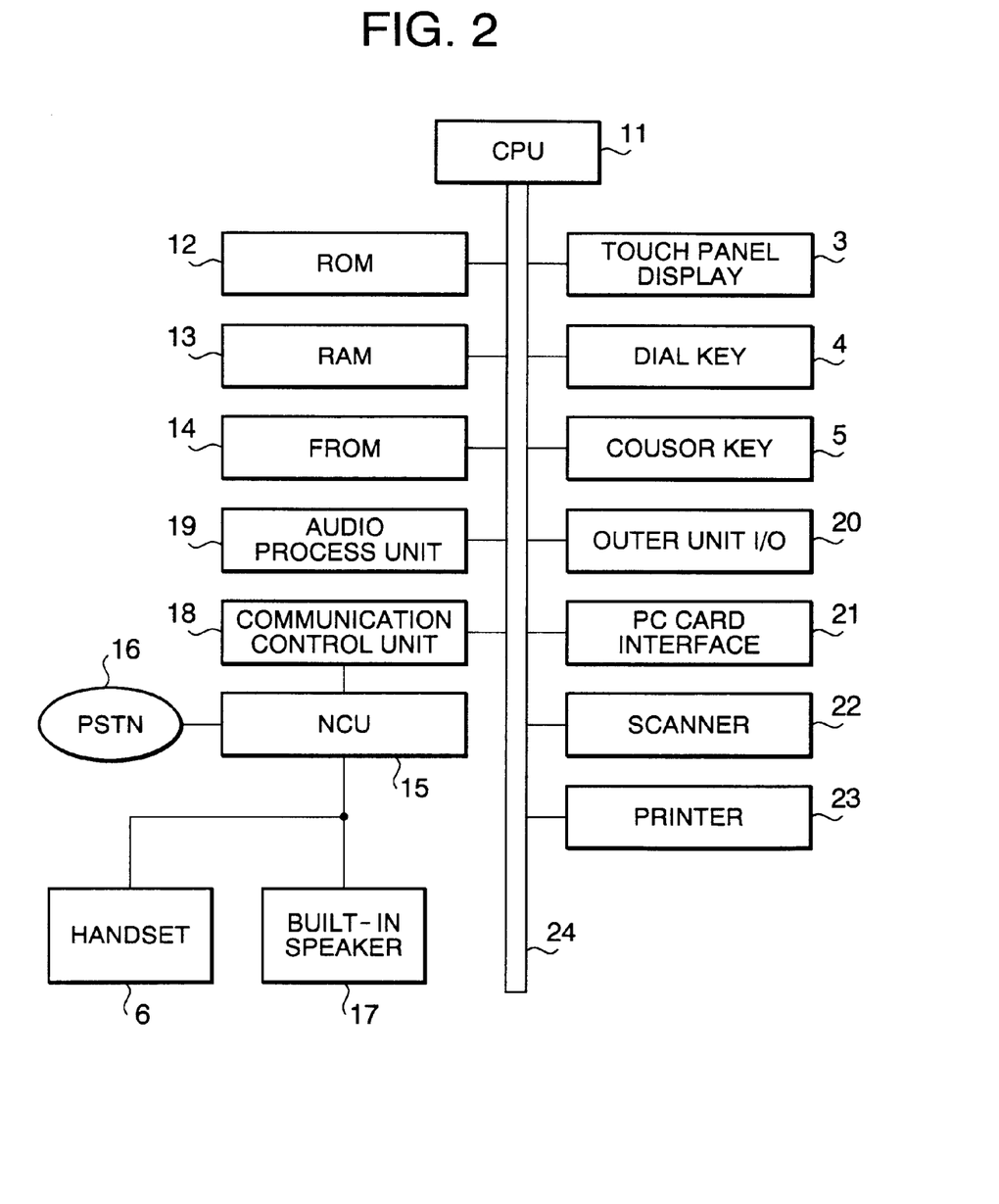
FIG. 2 is a block diagram of hardware of the facsimile apparatus of the above embodiment.

FIG. 2 is a hardware block diagram of the facsimile apparatus of the above embodiment.

A CPU (Central Processing Unit) 11 executes an object process in accordance with a program.

A ROM (Read Only Memory) 12 is a read-only memory storing a basic program such as a boot program.

A RAM (Random Access Memory) 13 is a main memory, which is used when the CPU 11 reads the program and data and executes the operation.

A flash memory (hereinafter referred to as an FROM) is a nonvolatile semiconductor memory, which is erasable and rewritable. The FROM stores mainly an execution program such as an application program and data.

A network control unit (hereinafter referred to as an NCU) 15 controls the transmission and reception of signals between a public switched telephone network (hereinafter referred as PSTN) 16 and the NCU 15. NCU 15 executes call out action and call in action, etc. The handset 6 and a built-in speaker 17 are connected to the NCU 15.

A communication control unit 18 executes data communication and facsimile communication through the PSTN 16. Though a facsimile modem is used in this example, a DSU (Digital Service Unit) and a terminal adapter (TA) may be used. The facsimile mode also digitizes a voice signal.

A voice process unit 19 encodes the digitized voice signal and compresses the signal, or decodes the compressed voice signal and decompresses the signal.

The touch panel display 3 comprises a liquid crystal panel display as a display unit and a touch panel as input means. The touch panel display 3 displays information and accepts a user's operation. More specifically, various kinds of information, input screen, operation menus, icons, buttons are displayed on the screen 3a of the touch panel display 3. The input of a character or a picture and the selection of the menu are carried out by touching the screen 3a with a pen or a finger.

The dial keys 4 are used for not only a telephone dial operation but also the input of numerals or characters to an input section displayed on the touch display panel 3.

An outer unit I/O 20 controls data communication with outer units such as a PC, a TA, a barcode reader, and an external modem. For example, a serial interface or a USB (Universal Serial Bus) is used as the outer unit I/O 20.

A PC card interface 21 controls the transmission and reception of data between a PC card and the facsimile apparatus. For example, a flash memory card, a modem card, a LAN card, an ISDN card, etc., can be used as the PC card.

A scanner 22 scans an original. A printer 23 prints various data of such as an image, a text, and so on.

A bus 24 is a channel for connecting the CPU 11 to each unit such as the ROM 12, RAM 13, and so on.

Figure 3:
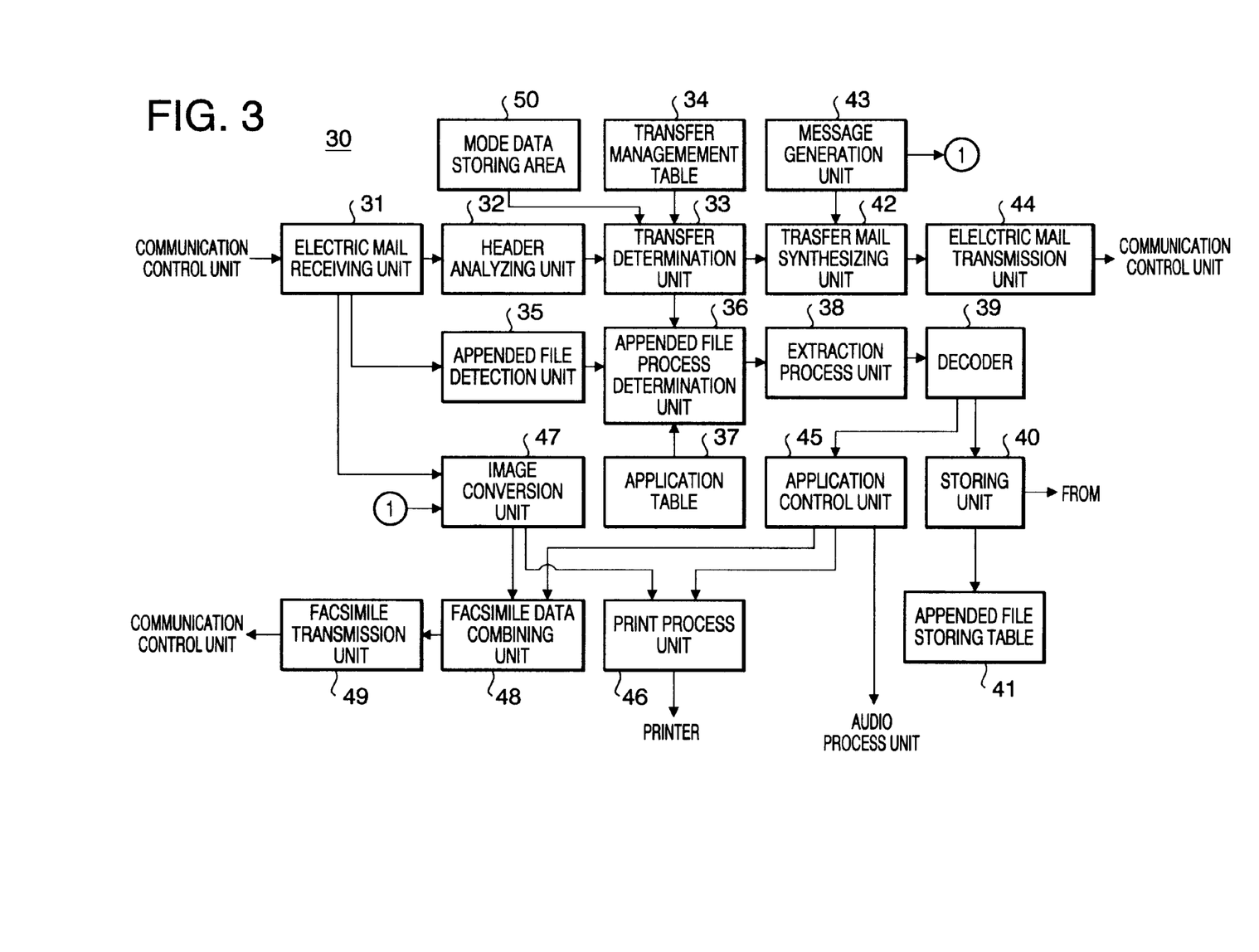
FIG. 3 is a functional block diagram showing an e-mail transfer process unit 30 of the facsimile apparatus of the above embodiment.

FIG. 3 is a functional flock diagram showing e-mail transfer unit 30 of the facsimile apparatus of the above embodiment.

An e-mail receiving unit 31 receives e-mail through the communication control unit 18. The reception of the e-mail is carried out by receiving a mail from a mailbox of a mail server. The reception of the e-mail is carried out in accordance with mail transfer protocol such as SMTP (Simple Mail transfer Protocol), POP (Post Office Protocol) 3, IMAP (Internet Message Access Protocol) 4, etc. The e-mail to be received is set in a format of for example MIME (Multipurpose Internet Mail Extensions).

The e-mail receiving unit 31 preferably receives the mails by accessing to the mail server periodically.

A header analyzing unit 32 analyzes a header portion of the received e-mail, thereby obtaining a sender mail address (hereinafter referred to as a sender ID).

A transfer determination unit 33 determines whether or not transfer is needed based on the sender ID obtained by the header analyzing unit 32. When the transfer is needed, a process to be provided is decided to adjust to the performance and the circumstance of the apparatus used in the transfer destination.

Figure 4:
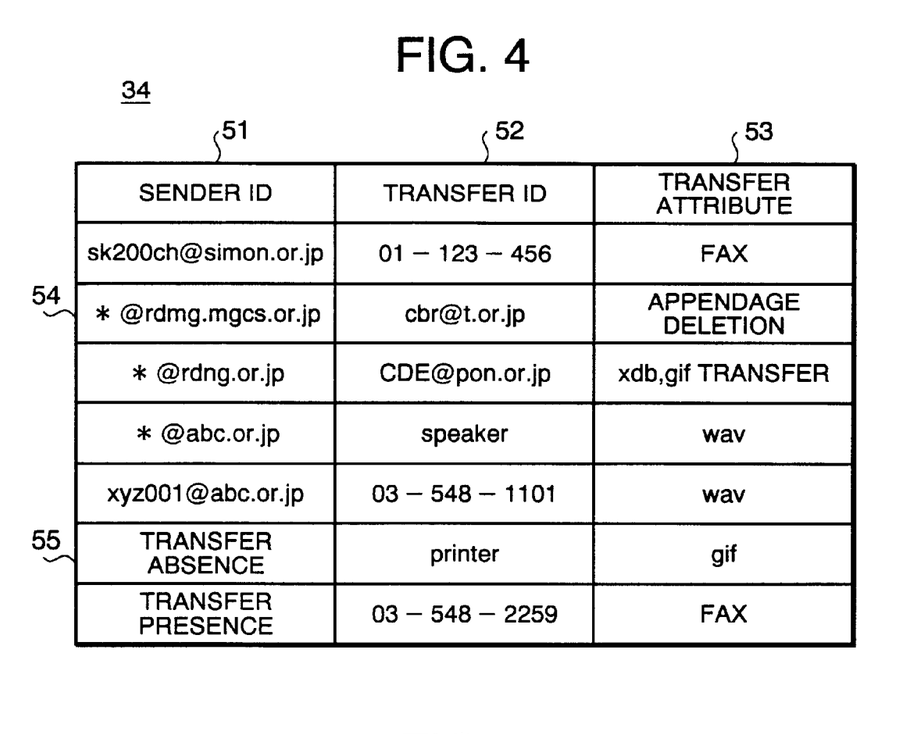
FIG. 4 is a view showing a transfer management table used in the facsimile apparatus of the above embodiment.

The above determination and decision are carried out in accordance with a transfer management table 34. FIG. 4 is a view showing the transfer management table used in the facsimile apparatus of the above embodiment. According to the transfer management table 34, information showing a transmission destination of the received e-mail, e.g., the sender ID, is registered in a sender ID column 51. In a transfer destination information column 52, information showing a transfer destination of the received e-mail is registered. More specifically, there are registered data transfer destination of the facsimile apparatus 1 such as the printer, the speaker on other than information specifying the transmission destination of e.g., an mail address, a facsimile number, etc.

In a transfer attribute column 53, transfer attributes are registered. The transfer attributes show kinds of data and the contents of the process corresponding to the transfer destination, respectively. For example, the data format is set to the facsimile, the e-mail is sent after the appended file is deleted from the e-mail, and the e-mail is directly transferred without being subjected to any process.

More specifically, for example, the transfer management table 34, second line 54 shows the following case. Thus, when the e-mail is received from "*@rdmg.gcs.mei.co.jp", which is the content of the sender ID column 51 (mark "*" denotes an arbitrary character string), the received e-mail is subjected to the process of "deletion of appendage", which is the content of the transfer attribute column 53. Thereafter, the e-mail is transferred to "cbr@t.or.jp.", which is the content of the transfer destination information column 52.

Similarly, the transfer management table 34, fifth line 55 shows a case of "transfer absence default", which is the content of the column 51, and which denotes that an output to the printer is set as a default without transferring to the outer unit. Also, the transfer management table 34, sixth line 56 shows a case of "transfer presence default", which is the content of the column 51, and which denotes that a facsimile transmission to a telephone number, 03-548-2259, is set as a default.

The transfer determination unit 33 carries out a matching process to check whether or not the sender ID obtained by the header analyzing unit 32 matches the content of the sender ID column 51 of the transfer management table 34.

An appended file detection unit 35 detects an appended file in the e-mail, and extracts an extension of the appended file.

An appended file process determination unit 36 determines a process content to be provided to the appended file in accordance with the attribute of the appended file and the determination result of the transfer determination unit 33. The appended file process determination unit 36 decides an application for expanding the appended file in accordance with an application table 37.

Figure 5:
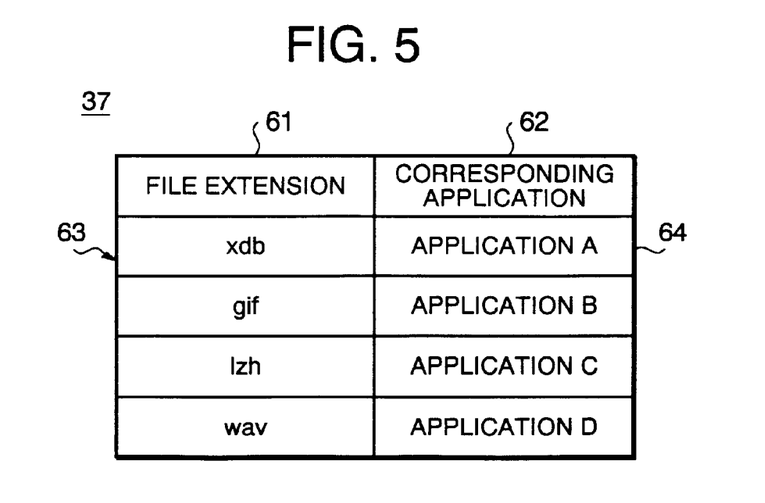
FIG. 5 is a view showing an application table of the facsimile apparatus of the above embodiment.

FIG. 5 is a view showing the application table of the above embodiment. According to the application table 37, extensions of the appended file and applications for extending the appended files are registered to be related to each other in an extension information column 61 and an application column 62. The extensions are used to make a distinction between the kinds of appended file. The applications are stored in a memory such as the FROM 14. These applications are software such as a word processor, a spreadsheeet, computer graphics, etc., which are executed in the facsimile apparatus 1.

More specifically, the application table 37, first line 63 shows that an extension "xdb" is registered in the extension information column 61, and that an application A for expanding the file of the extension "xdb" is registered in the application column 62. Though the extensions are used in this example, the extensions may not always be used if the kinds of appended file can be discriminated.

The application table 37 is stored in the memory such as the FROM 14, and can be changed appropriately.

The appended file process determination unit 36 carries out a matching process to check whether or not the content of an extension information column 71 of the application table 37 matches the extension of the appended file obtained by the appended file detection unit 35. As a result, when a match is found, the appended file process determination unit 36 decides the application registered in the application column 62 as an application for expanding the appended file. On the other hand, when a match is not found, the appended file process determination unit 36 determines that the appended file cannot be expanded.

An extraction process unit 38 extracts the appended file from the e-mail. A decoder 39 decodes the extracted appended file to binary data. A storing unit 40 stores the decoded appended file in the FROM 14. The storing unit 40 relates a file name of the appended file with the transfer destination so as to be registered in an appended file storing table 41.

A transfer mail synthesizing unit 42 generates a transfer mail in accordance with the determination of the transfer determination unit 33. The transfer mail synthesizing unit 42 uses a transfer destination ID registered in the transfer destination information column 52 of the transfer management table 34 as a destination (TO:) of the transfer mail. The transfer mail synthesizing unit 42 deletes the appended file from the e-mail as required, and adds a message generated by a transfer message generation unit 43 thereto.

An e-mail transmission unit 44 transmits the transfer mail to the mail server through the communication control unit 18. The e-mail transmission unit 44 transmits the e-mail in accordance with SMTP.

An application control unit 45 executes the application decided by the appended file process determination unit 36, and expands the appended file decoded by the decoder 39. The application control unit 45 outputs the expanded appended file as an image, depending on the application. When the appended file is an audio file, the application control unit 45 expands the appended file to be output to a voice process unit 19 as audio data.

A print process unit 46 makes the printer 23 print the image output by the application control unit 45.

An image conversion unit 47 converts the message of the text code generated by the transfer message generation unit 43 to an image. A facsimile data combining unit 48 combines the image output from the application control unit 45 and the imaged message, thereby obtaining facsimile data.

A facsimile communication unit 49 transmits facsimile data in a facsimile communication procedure through the communication control unit 18.

A mode data storing area 50 stores data showing whether or not the facsimile apparatus 1 is in a current transfer mode. This data is changed by an operator's mode setting operation. The transfer determination unit 33 determines the current mode with reference to the mode data storing area 50.

Figure 6:
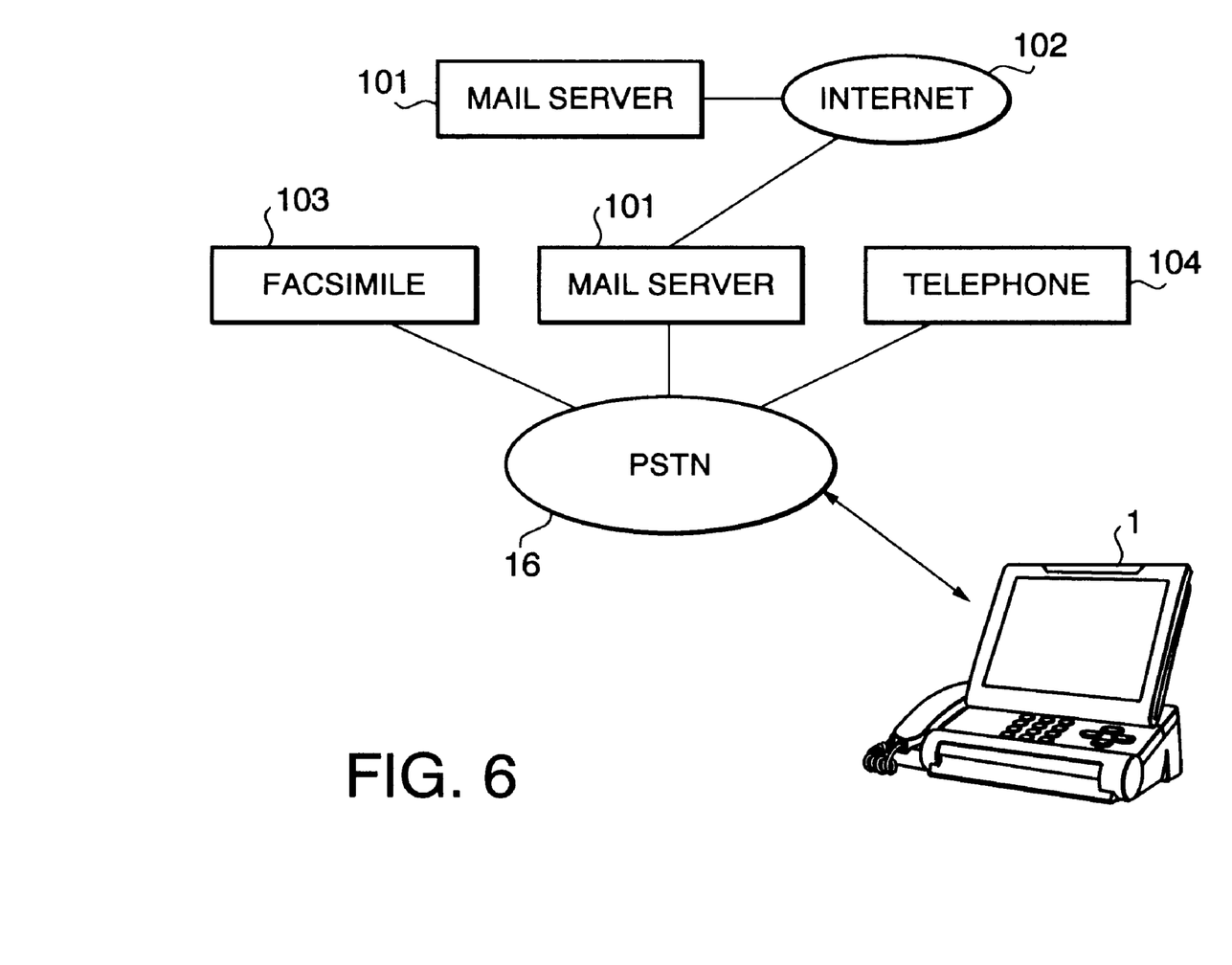
FIG. 6 is a conceptual view showing a network in which the facsimile apparatus of the above embodiment operates.

FIG. 6 is a conceptual view showing a network in which the facsimile apparatus of the above embodiment operates.

A plurality of mail servers 101 is connected to the Internet 102. The mail servers 101 mutually carry out the transmission and reception of the e-mail on the Internet 102. A certain mail server 101 is connected to the PSTN 16. Moreover, the facsimile apparatus 1 of the above embodiment, the other facsimile apparatus 103, and a telephone 104 are connected to the PSTN 16.

Figure 7:
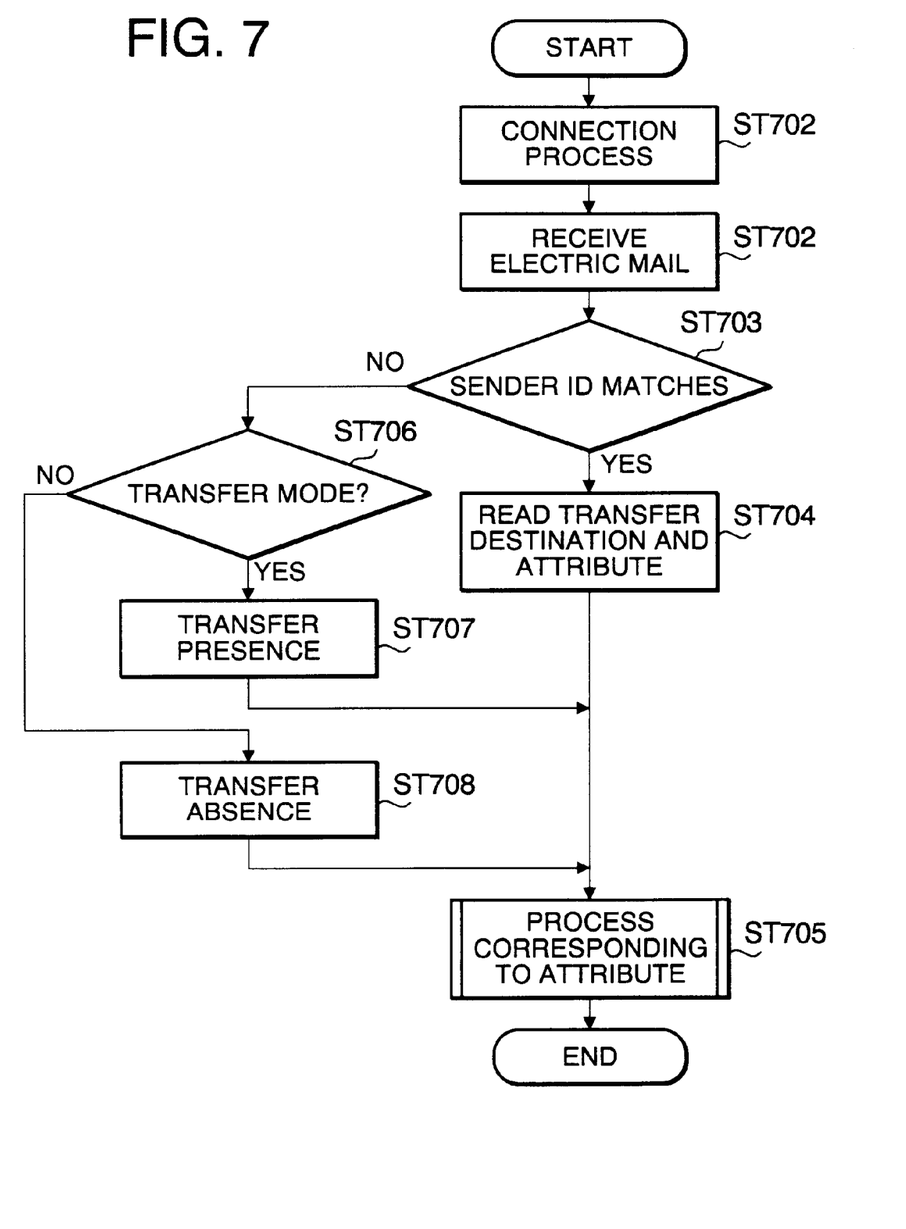
FIG. 7 is a flowchart showing a transfer operation in the facsimile apparatus of the above embodiment.

Next, the following will explain an operation of the transfer process in the above-structured facsimile apparatus 1. FIG. 7 is a flowchart showing the transfer operation in the facsimile apparatus 1 of the above embodiment.

In a step (hereinafter referred to as ST) 701, the facsimile apparatus 1 is connected to the mail server 101. More specifically, the facsimile apparatus 1 is directly connected to the mail server 101 of FIG. 6 through the PSTN 16 using the NCU 15 and the communication control unit 18. It is possible to dial up an Internet service provider to indirectly connect the facsimile apparatus 1 to the mail server 101 on the Internet 102. It is also possible to connect the facsimile apparatus 1 to the mail server 101 on the Internet 101 via a LAN.

In ST702, the e-mail receiving unit 31 receives e-mail from the mailbox of the mail server 101.

In ST703, the header analyzing unit 32 analyzes the header portion of the received e-mail, thereby obtaining a sender ID. Next, the transfer determination unit 33 carries out a matching process to check whether or not the obtained sender ID matches the content of the sender ID column 51 of the transfer management table 34.

When a match is found in ST703, the transfer determination unit 33 reads the transfer destination information column 52, which corresponds to the content of the sender ID column 51, and the content of the transfer attribute column 53 in ST704.

In ST705, the facsimile apparatus 1 executes the process corresponding to the content of the transfer attribute column 53 read in ST704. The specific process content will be described later.

On the other hand, when no match is found in ST703, the transfer determination unit 33 determines whether or not the current setting is a transfer mode with reference to the mode data storage area 50 in ST706.

When the current setting is the transfer mode, the transfer determination unit 33 reads the contents of the transfer destination ID column 5 and the transfer attribute column 53 which corresponds to "transfer presence default", that is the content of the sender ID column of the transfer management table 34, in ST706. Thereafter, the operation goes to ST705, and the process corresponding to the content of the transfer attribute column 53 read in ST706 is executed.

When the current setting is not the transfer mode in ST706, the transfer determination unit 33 reads the transfer destination ID 52, which corresponds to "transfer absence default", that is the content of the sender ID column, and the content of the transfer attribute column 53 in ST708. Thereafter, the operation goes to ST705, and the process corresponding to the content read in ST708 is executed.

Next, the process operation executed in ST705 of FIG. 7 will be specifically explained.

Figure 8:
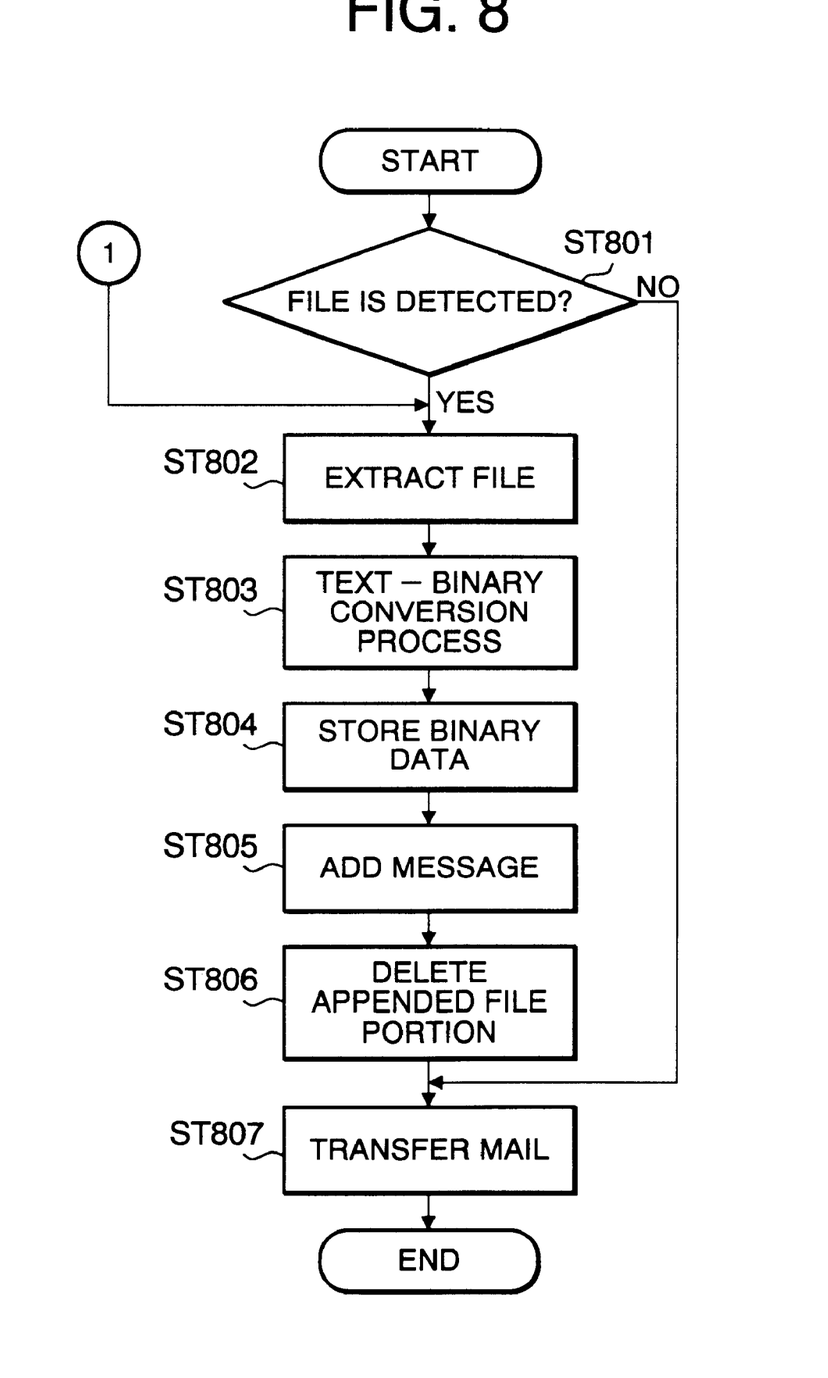
FIG. 8 is a flowchart showing one example of transfer processes in the facsimile apparatus of the above embodiment.

First, the following will explain the process when the content of the transfer attribute column 53 is "deletion of appendage." FIG. 8 is a flowchart showing one example of the transfer processes in the facsimile apparatus of the above embodiment.

In ST801, the appended file determination unit 36 determines whether or not the appended file is detected in the received e-mail by the appended file detection unit 35.

When the appended file is detected in the received e-mail mail, the extraction process unit 38 extracts the appended file portion from the e-mail in ST802.

In ST803, the decoder 39 decodes the extracted appended file portion from the text code to binary data. Then, in ST804, the storing unit 40 stores the decoded binary data in the FROM 14. At the same time, a file name of binary data is made to correspond to a receiver ID and transfer destination information so as to be registered in the appended file storing table 41.

In ST805, the transfer mail synthesizing unit 42 adds the message generated by the message generation unit 43 to the e-mail. The message includes information of the presence of the appended file, a file name, a file size, etc. Specifically, for example, "the appended file is present, "kaneko.xdb" in the file name, and 1024k bytes in the file size", are included. In this case, the file size indicates the size of data obtained when the appended file is decoded.

In ST806, the transfer mail synthesizing unit 42 deletes the appended file portion from the e-mail having the message added in ST805. Thereby, a transfer mail, having the main part and the message generated in ST705, can be obtained.

In ST807, the e-mail transmission unit 44 transmits the transfer mail synthesized by the transfer mail synthesizing unit 42 to the transfer destination shown in the transfer destination information column 52.

On the other hand, when the appended file is not detected in the received e-mail in ST801, the operation jumps to ST807, and the e-mail with no appended file is transferred.

The above process of the deletion of appendage separately from the e-mail, a safer data protection can be improved.

The deleted appended file is decoded from the text code to binary data so as to be stored in the FROM 14 and data size can be reduced, thereby making it possible to decrease a memory capacity for temporarily storing data.

The storing unit 40 prepares the appended file storing table 41, and manages the file name of the decoded appended file, the sender ID, and the transfer destination to be made to correspond to each other. As a result, the user can know the sender and the transfer destination with reference to the appended file storing table 41. Also, it can be easily understood to which route the appended file is stored in the FROM 14.

Figure 9:
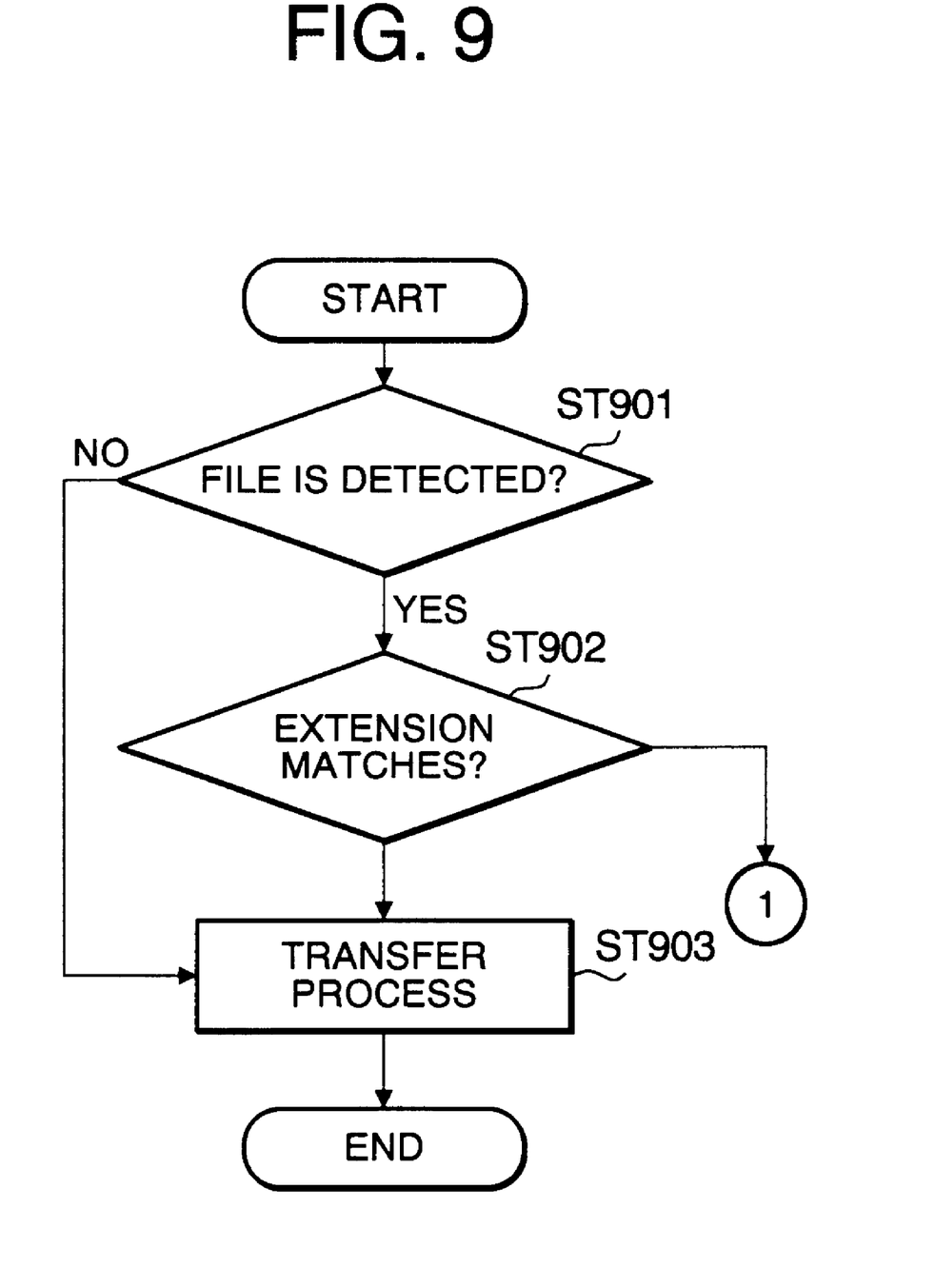
FIG. 9 is a flowchart showing one example of transferring processes in the facsimile apparatus of the above embodiment.

Next, the following will explain the process when the content of the transfer attribute column 53 is "xdb, gif transfer." FIG. 9 is a flowchart showing one example of the transfer processes in the facsimile apparatus of the above embodiment.

In ST901, the appended file detection unit 35 detects the appended file in the received e-mail. When the appended file is detected, the transfer determination unit 33 determines whether the extension of the file name of the appended file matches "gift" or "xbd" in ST902. When the extension is applied to a case in which the PDA is took alone when one is away from office can receive the e-mail but no application corresponding to the appended file is mounted to the PDA.

Thus, in the above process, the facsimile apparatus 1 transfers the transfer mail to the transfer destination in a state that the appended file is deleted from the e-mail by the transfer mail synthesizing unit 42. Then, a user can receive only the main part of the e-mail. Therefore, a reception memory of the PDA can be prevented from being full of the appended files. At the same time, since the time required for the reception of the appended file can be saved, communication time can be largely reduced. Moreover, since it is unnecessary for the user to confirm the received appended file to delete the unexpandable appended file, the efficiency of the reception procedure can be improved.

Moreover, the addition of the message to the transfer mail allows the user to know the reception of the appended file, the appended file name, and the file size when one is away from office.

The deleted appended file is stored in the FROM 14. There is high possibility that data will be lost because of the battery exhaustion of the PDA or the loss of the PDA when one is away from office. However, since the appended file is stored of the file name of the appended file matches either "gif" or "xbd" in ST902, the e-mail transmission unit 44 transmits the e-mail including information of the appended file to the transfer destination shown in the transfer destination information column 52 in ST903.

When extension of the file name of the appended file matches neither "gif" nor "xbd" in ST902, the operation goes to ST802 of FIG. 8, and the above-mentioned deletion of appendage is executed.

When the appended file detection unit 35 does not detect the appended file in ST901, the operation jumps to ST903 and the e-mail with no appended file is transferred.

Such a transfer process in which the appended file is not deleted is applied to a case, for example, in which the PDA is equipped with the application corresponding to the appended file.

In the facsimile apparatus 1, the transfer determination unit 33 determines whether or not the deletion of the appended file is needed in accordance with the contents of the transfer destination information column 52 and the transfer attribute column 53 in the transfer management table 34. Then, the appended file can be deleted and transferred, or directly transferred in accordance with the transfer destination and the kinds of the appended file. As a result, the facsimile apparatus 1 can selectively transfer only the specific kind of the appended file in accordance with the environment at the place where one is staying . The user can receive only information, which is necessary and which is usable for the PDA, selectively. This can prevent the memory of the PDA from being occupied by useless information, and reduce the charges for communication network.

In other words, the facsimile apparatus 1 provides the process to e-mail data in accordance with the environment of the transfer destination, thereafter transferring e-mail data. This allows the use of e-mail data without providing any process in the transfer destination. In this case, the process in accordance with the environment in the transfer destination includes the appended file deletion process, compression and decompression of a file, a file format conversion process, a character code conversion, etc.

Note that similar operation is repeated in a case in which a plurality of files is appended to e-mail, thereby obtaining the same advantages as mentioned above.

Figure 10:
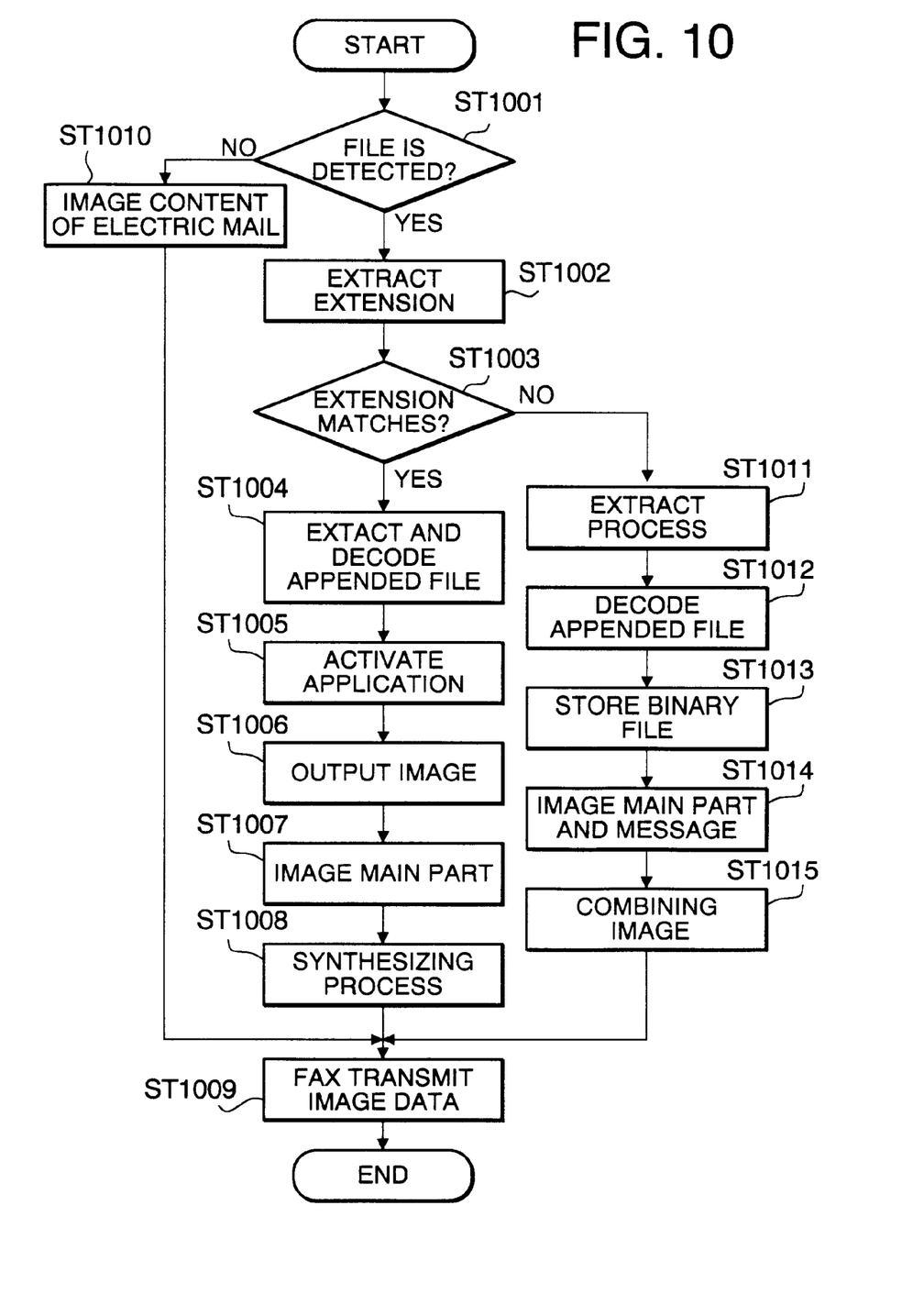
FIG. 10 is a flowchart showing one example of processes in the facsimile apparatus of the above embodiment.

Next, the following will explain the process when the content of the transfer attribute column 53 is "FAX." FIG. 10 is a flowchart showing one example of the transfer processes in the facsimile apparatus of the above embodiment.

In ST1001, the appended file detection unit 35 detects the appended file in the received e-mail. When the appended file is detected, the appended file detection unit 35 extracts an extension from the file name of the appended file in ST1002.

In ST1003, the appended file process determination unit 36 carries out a matching process to check whether or not the extension extracted in ST1002 matches the content of the extension information column 61 of the application table 37.

When a match is found in ST1003, the extraction process unit 38 extracts the appended file portion from the e-mail, and the decoder 39 converts the extracted appended file portion from the text code to the binary code in ST1004.

In ST1005, the application control unit 45 activates and executes the application corresponding to the extension so as to read the decoded file.

In ST1006, the application control unit 45 converts the decoded file to an image file and stores the file in the application temporarily. The conversion of the decoded file to the image file is carried out in the same way as the general print process.

In ST 1007, the image conversion unit 47 converts the main part having the text of the e-mail to an image. Sequentially, in ST1008, the facsimile data combining unit 48 combines the image file of the appended file and the image of the main part, thereby obtaining facsimile data.

In this case, the message, indicating that facsimile data is the content of the appended file, may be added to the image file. Thereby, it can be easily understood whether facsimile data is only the main part of the e-mail or includes the appended file.

In ST1009, the facsimile transmission unit 49 transfers facsimile data to the transfer destination through the communication control unit 18.

When no match is found in ST1003, the extraction of the appended file, the decoding, the storing, and the addition of the message are carried out in ST1011 to ST1013 in the same way as in ST802 to ST804 of FIG. 8.

Thereafter, in ST1014, the transfer message generation unit 43 generates a message. Then, the image conversion unit 47 converts the main part of the e-mail and the message to images.

In ST1015, the facsimile data combining unit 48 combines the images of the main part and the message, thereby obtaining facsimile data. In ST1009, the facsimile transmission unit 49 transmits facsimile data.

The transfer process in the facsimile communication is applied to the environment in which only the facsimile apparatus is provided when one is away from office.

Thus, the facsimile apparatus 1 can image the appended file so as to be transferred through the facsimile communication. Therefore, even in the environment in which only the facsimile apparatus is provided when one is away from office, the contents of the e-mail and the appended file can be received, and this comes in extremely useful.

The above showed the example in which the content of the e-mail was transferred through the facsimile communication, and explained the point that the main part of the e-mail was converted to the image. For outputting the main part of the e-mail, however, it is not necessarily needed that the main part be imaged. A general character print process is preferably carried out in order to improve process speed.

Next, the following will explain the process when the content of the transfer attribute column 53 is "wav." The content "wav" is a kind of extension for an audio file, and this is hereinafter referred to as a wav file.

First of all, a case in which transfer destination information is "speaker" will be explained. In the appended file process determination unit 36, the appended file is extracted by the extraction process unit 38 and decoded by the decoder 39. The application control unit 45 activates an application D. The application D reproduces the decoded wav file by a voice process unit so as to be output from the built-in speaker 17. The wav file may be output from the handset 6 in place of the built-in speaker 17.

Next, a case in which transfer destination information is a telephone number will be explained. In this case, the application control unit 45 activates the application and executes the following transfer processes. First, a telephone number "03-548-1101" registered in the transfer destination information column 52 is called out. When the network is connected, the wav file is repeatedly reproduced a predetermined number of times. This allows the user to listen to the message, serving as the wav file, appended to the e-mail on the telephone when one is away from office. In this case, the repeated reproduction of the wav file can prevent the user from failing to listen to the message.

Next, the following will explain the process when "transfer absence default" is described in the sender ID column 51 of the transfer management table 34.

In the transfer destination information column 52 corresponding to the sender ID column 51 and the transfer attribute column 53, "printer" and "gif" are described respectively.

In this case, the appended file portion is generally deleted as already explained, and the header of the e-mail and the main part are output from the printer. However, when the extension of the appended file is gif, the content of the appended file is also output from the printer 23. More specifically, when the appended file process determination 36 determines that the extension of the appended file is gif, the application control unit 45 activates an application B in accordance with the application table 37. The application B opens the appended file decoded, and outputs the image file.

Such a default setting is used when the transfer is not carried out in the facsimile apparatus 1.

According to the above process, since the facsimile apparatus prints the content of the received e-mail when the transfer is not carried out, the user can watch the content of the e-mail as soon as the user returns.

Also, the content of the e-mail including the appended file portion can be printed. This can save time for executing the printing including a series of operations in which the appended file portion is decoded to the binary file and the application is activated and execute the printing after the user returns to the office.

Thus, the facsimile apparatus 1 of this embodiment transfers the e-mail received from the mail server 101. Since the transfer can be executed by the facsimile apparatus 1, the transfer function may not be provided in the mail server 101. Moreover, since the transfer is executed in accordance with the content registered in the transfer management table 34 of the facsimile apparatus 1, not the manager of the mail server 101 but the user can register and change the content oneself.

When the facsimile apparatus 1 transfers the e-mail when the sender ID matches the registered content, the facsimile apparatus can transfer the e-mail from the specific sender to the transfer destination selectively.

The sender ID corresponds to the transfer destination, so that the facsimile apparatus can transfer the e-mail from the specific sender to the transfer destination and serve as a repeater. The above embodiment explained the facsimile apparatus having the e-mail communication function. The present invention can be applied to household electrical appliances such as an Internet-capable telephone, an Internet-capable television, etc., if they are communication terminals, which can receive and transmit the e-mail.

Figure 11:
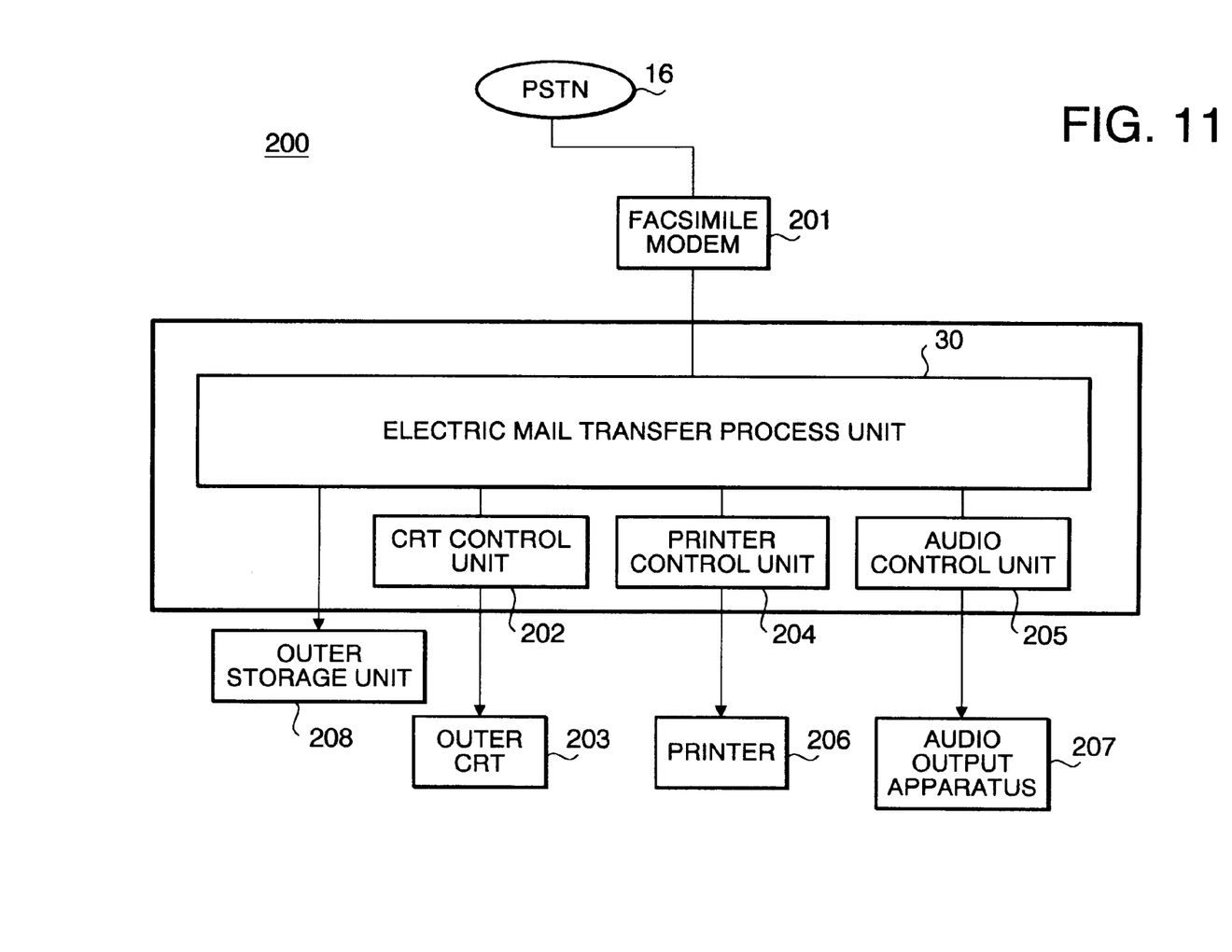
FIG. 11 is a block diagram showing a modification of the e-mail transferring apparatus of the above embodiment.

FIG. 11 is a block diagram showing a modification of the e-mail transfer apparatus of the embodiment of the present invention. An e-mail transfer apparatus 200 is equipped with the e-mail transfer process unit 30 of FIG. 3. The e-mail transfer apparatus 200 receives and transmits the e-mail and facsimile data through a facsimile modem 201 via the PSTN 16. The e-mail transfer apparatus 200 is connected to an outer CRT 203 through a CRT control unit 202. Also, a printer 206 and an audio output apparatus 207 such as a speaker are also connected to the facsimile apparatus 200 through a print control unit 204 and an audio control unit 205, respectively. Moreover, an outer storage device 208 such as HDD is connected to the outer unit.

Thus, even if the communication apparatus, the display unit, the printer, the voice output unit, and the storage unit are connected, the same advantage as in the facsimile apparatus of the above-mentioned embodiment can be obtained.

What is claimed is:

1. An electronic mail transferring apparatus for transferring electronic mail to a designated destination connected to the electronic mail transferring apparatus, the electronic mail transferring apparatus comprising:

an electronic mail receiver that receives an electronic mail capable of including an appended file portion;

a memory configured to store a plurality of destination addresses and transfer attributes, a transfer attribute associated with each destination address, the transfer attributes including discriminators that identify a type of data of the electronic mail, the transfer attributes further including an indicator that an appended file portion is to be deleted, the memory being further configured to associate each discriminator with a processing to be applied to each type of data;

a detector that detects whether or not a destination of the received electronic mail is stored in said memory and whether or not the received electronic mail contains an appended file portion;

a reader that reads the associated transfer attribute from said memory when said detector detects that the destination of the received electronic mail is stored in said memory;

a deletor that, upon detection by said detector that the electronic mail contains an appended file portion, and based upon a determination that the transfer attribute, stored in the memory in association with the destination address, contains the indicator for deletion of the appended file portion, deletes the appended file portion from the electronic mail received by said electronic mail receiver and does not delete the appended file portion from the electronic mail received by the electronic mail receiver if the transfer attribute does not contain the indicator for deletion of the appended file portion;

said memory further storing the appended file portion deleted by said deletor;

a transferring mail generator that generates a transferring mail comprising the received electronic mail from which the appended file portion was deleted together with a message indicating that the appended file portion has been deleted; and a transmitter that transmits the transferring mail to the designated destination.

2. The electronic mail transferring apparatus according to claim 1, said transmitter transmitting the transferring mail to the designated destination without a request sent by the destination.

3. The electronic mail transferring apparatus according to claim 1, further comprising a converter that converts the appended file portion into binary data and stores the binary data into said memory.

4. The electronic mail transferring apparatus according to claim 1, further comprising:
   a scanner configured to scan an original to obtain image data; and
   a facsimile transmitter that transmits the image data to a destination terminal.

5. The electronic mail transferring apparatus according to claim 4, wherein said scanner, said facsimile transmitter, said transmitter and said memory are integrated in the electronic mail transferring apparatus.

6. The electronic mail transferring apparatus according to claim 1, the destination comprising a portable digital terminal.

7. A method for transferring electronic mail to a destination, using an electronic transferring apparatus which includes a memory storing a plurality of destination addresses and transfer attributes, a transfer attribute associated with each destination address, the transfer attributes including a discriminator that identifies a type of data of the electronic mail, the transfer attribute further including an indicator that an appended file portion is to be deleted, the memory being configured to associate each discriminator with a processing to be applied to each type of data, the method comprising:
   receiving an electronic mail capable of including an appended file portion;
   detecting whether or not a destination of the received electronic mail is stored in the memory and whether or not the received electronic mail contains an appended file portion;
   reading the associated transfer attribute from the memory when the detecting detects that the destination of the received electronic mail is stored in said memory;
   deleting the appended file portion from the received electronic mail, upon detection that the electronic mail contains an appended file portion and based upon the transfer attribute stored in the memory associated and with the destination address contains the indicator for deletion;
   storing the deleted appended file portion into the memory and not deleting the appended file portion when the transfer attribute stored in the memory does not contain the indicator for deletion, the deletion of the appended file portion further including extraction of the appended file portion from the received electronic mail, converting the extracted appended file portion to binary data and storing the binary data in the memory;
   generating a transferring mail comprising the received electronic mail from which the appended file portion was deleted together with a message indicating that the appended file portion has been deleted; and
   transmitting the transferring mail to the designated destination.

8. The method according to claim 7, further comprising converting the appended file portion into binary data and storing the binary data into the memory.

* * * * *